United States Patent [19]

Labaton et al.

[11] Patent Number: 4,886,048
[45] Date of Patent: Dec. 12, 1989

[54] HYDROGEN PUMP

[76] Inventors: Isaac J. Labaton, 5/9 HaTenna, Givat Ze'ev, Jerusalem; Yehuda Harats, 53 Hizkiyahu Hamelech, Jerusalem, both of Israel

[21] Appl. No.: 173,189
[22] Filed: Mar. 23, 1988

[30] Foreign Application Priority Data

Mar. 31, 1987 [IL] Israel ........................................ 82070

[51] Int. Cl.⁴ .............................................. B22B 19/00
[52] U.S. Cl. ................................. 165/104.27; 126/443
[58] Field of Search ..................... 165/104.27; 126/443

[56] References Cited

U.S. PATENT DOCUMENTS 3,503,438 3/1970 Geyer ........................ 165/104.27 X
4,142,509 3/1979 Herman et al. ................. 165/135 X
4,159,737 7/1979 Biermann et al. ......... 165/104.27 X

FOREIGN PATENT DOCUMENTS 121450 9/1979 Japan .............................. 165/104.27

Primary Examiner—Randall L. Green

[57] ABSTRACT

The invention provides a hydrogen pump for vacuum insulation jackets for a vessel or a pipe which holds or through which flows a hydrogen-containing medium at temperatures such that hydrogen permeates into the jacket, comprising a palladium or palladium alloy membrane exposed on one side to an oxidizing atmosphere and on its other side to the evacuated space within the jacket, wherein the membrane enables the flow of the hydrogen from the evacuated space through the membrane into the oxidizing atmosphere.

5 Claims, 2 Drawing Sheets

HYDROGEN PUMP

The present invention relates to a hydrogen pump for use in vacuum-insulated vessels. More particularly the present invention relates to a hydrogen pump for use in vacuum-insulation jackets for vessels or pipes which contain or through which flow a hydrogen containing medium.

One of the most interesting examples of the use of the vacuum-insulation jackets are certain types of commercial industrial solar collectors which absorb solar energy into a chamber containing a heat transfer fluid (HTF). In order to prevent convective and conductive heat losses, the chamber is surrounded by a vacuum jacket. The HTF which comprises hydrogen-containing compounds is known to decompose when heated over extended periods of time.

One of the by-products of this decomposition is molecular hydrogen which permeates from the HTF through the pipe wall and into the vacuum jacket by way of diffusion. This leakage dilutes the vacuum, reducing (or even destroying) the efficiency of the solar collector or any other vacuum insulated container.

As an example, from a total amount of 860,000 U.S. gallons (3,260,000 liters) of a typical HTF (such as Caloria$^R$ HT43), 93.8 kg will decompose per hour at a temperature of 585° K. (312° C.); 1.56%, or 1.46 kg of the degradation products are $H_2$ molecules. The outgassing of $H_2$ into the vacuum amounts to 83 liter torr/3,000 h per collector, thus within minutes reducing a vacuum with an initial pressure of $10^{-5}$ torr to one with a pressure $>10^{-3}$. The problem therefore becomes acute and may be solved either by reducing the amount of $H_2$ permeating into the vacuum jacket, or by an appropriate treatment of the gas immediately after permeation.

Various ways have been mooted for dealing with this problem, such as the use of getter materials, sintered filters, HTF purifiers, hydrogen-free heat transfer fluids, treatment of the central pipe wall steel, dynamic pumping, yet none of these proposed solutions have proved to be economical and feasible.

Getter materials are widely used to remove gaseous impurities such as carbon monoxide, oxygen, nitrogen, hydrocarbons, water vapour and hydrogen isotopes from a sealed vacuum. Up to its limited capacity, the gettering material is suitable for "pumping" out the residual gas in a vacuum. However, $H_2$ as is generated by the HTF, is produced continuously and thus can hardly be taken care of by getters. For typical getters, the capacity amounts to about 30 liter torr/g. Assuming an $H_2$ outgassing of 83 liter torr/3,000 h per collector, the getters would require about 164 g material per collector to fully remove the $H_2$ for a period of 20 years. Obviously this is highly uneconomical.

A sintered membrane which is selective with respect to $H_2$, leaving the other gases within the HTF, is as yet only hypothetically possible. If such a material could be found, it would possibly represent a means to get rid of the $H_2$. However, that would still leave atomic hydrogen produced on the walls of the collector, (as a result of interaction of the HTF with the wall material), which is equally able to penetrate the wall and may play a considerable role in critically reducing the vacuum.

A drastic reduction of the permeation through the steel wall could in principle ensure the maintenance of the vacuum. Such reduction possibilities, although too expensive or not efficient enough, are as follows:

(1) Covering the steel with aluminium sleeves.
(2) Diffusion of aluminum into the pipe walls.
(3) Various kinds of coatings.

The vacuum may be maintained by dynamic pumping, periodically removing the outgassed $H_2$. This action may be assisted by a smaller amount of gettering material than proposed above. However, this type of solution would be troublesome and still quite uneconomical.

It is one of the objects of the present invention to overcome the above-mentioned difficulties and to provide means for inexpensive, efficient and maintenance-free removal of hydrogen infiltrating a vacuum insulation jacket.

This the invention achieves by providing a hydrogen pump for vacuum insulation jackets for a vessel or a pipe which holds or through which flows a hydrogen-containing medium at temperatures such that hydrogen permeates into said jacket, comprising a palladium or palladium alloy membrane exposed on one side to an oxidizing atmosphere and on its other side to the evacuated space within said jacket, wherein said membrane enables the flow of said hydrogen from said evacuated space through said membrane into said oxidizing atmosphere.

The invention further provides a hydrogen pump for use in a solar energy collector of the type utilizing fluids of hydrogen-containing compounds for heat transfer and having a vacuum jacket for achieving thermal insulation, into which vacuum permeates hydrogen produced by the decomposition of said heat transfer fluid, comprising a palladium or palladium alloy membrane exposed on one side to an oxidizing atmosphere and on its other side to the evacuated space within said jacket, wherein said membrane enables the flow of said hydrogen from said evacuated space through said membrane into said oxidizing atmosphere.

The hydrogen pumping palladium membrane used in the present invention can be of uniform composition, i.e., can be of palladium or palladium alloy or can be a palladium coated membrane having a hydrogen permeable substrate such as nickel or steel coated with palladium or a palladium alloy since hydrogen atoms are chemisorbed and dissociated on one surface of a palladium or palladium coated membrane and dissociated hydrogen atoms defuse through the membrane and react with oxygen in the presence of the palladium or palladium alloy on the outer surface of the membrane and thus the term membrane used herein includes palladium and palladium alloy coated membranes.

Thus it has now been found that a palladium (Pd) or palladium alloy pump in connection with the solar energy collector or other applications of the vacuum insulation jacket meets all the requirements from the physical/technical as well as from the economical point of view. The advantages of the Pd or Pd alloy membrane method compared to the previously proposed solutions are:

(1) No need for replacing or replenishing as is the case for getters, sintered filters, HTF purifiers, etc.;

(2) Highly efficient at working temperatures of solar collectors, pipes containing hot HTF, etc.

(3) Inexpensive and reliable;

(4) Performance does not drop significantly with time (compared to getters, filters, etc.).

It is well known that the permeation rate of $H_2$ through Pd or Palladium alloys is very high, with the direction of the hydrogen flow from the high hydrogen pressure side to the side with low pressure. However, hot Pd or Pd alloys constitute a catalyst for the combination of hydrogen and oxygen to form water. This is the crucial fact which makes it possible to evacuate hydrogen from the interior of the vacuum jacket with its relatively low $H_2$ partial pressure, to the outside atmosphere with its relatively high $H_2$ partial pressure, using a hot Pd or Pd alloy membrane, the other side of which is exposed to air ($O_2$). In an oxidizing atmosphere such as air, hydrogen in the air in the neighborhood of the hot Pd or its alloy, will strike the membrane and will eventually react with oxygen to form water, thus reducing the partial $H_2$ pressure on the exterior membrane surface, thereby establishing a large hydrogen concentration gradient across the hot diaphragm, producing a pumping action moving $H_2$ from the vacuum into the air.

The theoretical pumping efficiency of a small Pd alloy window incorporated in elements of a typical solar collector of the concentrator type is calculated as follows: The permeation constant K of $Pd_{0.8}Ag_{0.2}$ is given by Holleck (J. Phys. Chem. 74, 503, (1970)):

$$K = 7.5 \times 10^{-4} \text{ cm}^{-3} \text{ (STP) sec}^{-1} \text{ cm}^{-1} \text{ atm}^{-\frac{1}{2}}$$

for 154° C. (427° K.).
Converting to MKS units, $$K = 1.79 \times 10^{-5} \text{ liter torr sec}^{-1} \text{ m}^{-1} \text{ Pa}^{-\frac{1}{2}}$$

Given a jacket permeation rate of $7.68 \times 10^{-6}$ liter/torr $\text{sec}^{-1}$ and using a Pd alloy membrane (2 cm²/0.25 mm) at 154° C., $$Q = 7.68 \times 10^{-6} \text{ liter torr sec}^{-1} = KP^{\frac{1}{2}} 2 \times 10^{-5} \text{ m}^2 (0.25)^{-1} \text{ m}^{-3} \times 10^{-3}$$

At the collector, an $H_2$ equilibrium pressure P will be attained of $$P = 2.876 \times 10^{-3} \text{ Pa} = 2.15 \times 10^{-5} \text{ torr}.$$

This result is based on the ideal assumption that the effective external $H_2$ partial pressure is zero, which in practice, is, however, not the case.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
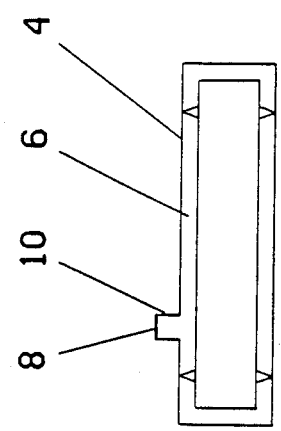
FIG. 1 is a schematic view of a vacuum insulation jacket for a container of a hydrogen containing medium with the hydrogen pump according to the invention incorporated.

Referring now to the drawings, there is seen in FIG. 1 a vessel 2 for a hydrogen-containing medium, surrounded completely or partially by a thermally insulating jacket 4. Insulation is effected by evacuating the space 6 between vessel 2 and jacket 4. The hydrogen-pumping palladium or palladium-alloy membrane 8 is welded or brazed to a pipe socket 10 attached to, and communicating with, the jacket 4.

Figure 2:
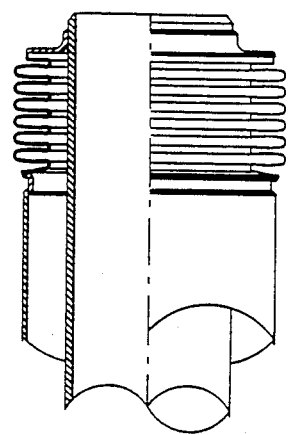
FIG. 2 is a partly cross-sectional view of a solar collector of the concentrator type, with a Pd alloy window incorporated in the heat collector element.

FIG. 2 shows a vacuum-insulated pipe unit of a solar collector of the concentrator type. There is seen an inner pipe 12, made of steel, or stainless steel, through which flows the heat-absorbing, hydrogen-containing medium. The inner pipe 12 is surrounded by an outer pipe 14, made of glass, through which the sunrays, focused by the collector mirror, reach the inner pipe 12. There are also seen two bellows 16, the function of which is quite obvious: as the inner pipe 12 carries the hot medium, it expands to a far greater extent than does the outer pipe 14. This differential expansion is taken up by the bellows.

For thermal insulation, the space 18 between inner and outer pipe is evacuated. There is further seen a thin membrane 20, brazed or welded to a metal socket 22 itself attached to the glass pipe 14 by a metal-glass joint. The hydrogen-pumping effect of this arrangement has been explained hereinbefore. Methods to activate the membrane 20 by heating will be discussed further below.

An experiment was carried out to test the hydrogen pump according to the invention. A vacuum chamber with:

(1) a source of $H_2$ controllable by means of a leak valve A (2) a connection to a high vacuum pump via a leak valve B (3) a Pd alloy membrane t=0.25 mm, A=2.0 cm²
As $Pd_{0.75}Ag_{0.25}$ has better mechanical properties than pure Pd, a membrane of this alloy was selected for the test purposes.

Hydrogen flowed into the vacuum chamber through the above mentioned valve A and exited the chamber through the valve B. With a cold Pd membrane, the initial steady state hydrogen pressure recorded was $P_i(H_2) = 2.66 \times 10^{-5}$ torr.

A beam of light was concentrated onto the membrane, starting to heat it up.

Immediately after, pressure in the chamber started to drop, reaching after 24 minutes the value of $P_f(H_2) = 5.83 \times 10^{-7}$ torr. Membrane temperature was 154° C. This experiment was repeated several times with substantially the same results.

From an analysis of the experimental results, the pumping rate $S_p$ of the palladium membrane is calculated as $$S_p = 8.76 \times 10^{-1} \text{liter/s}$$

Therefore, using a 2.5 cm² membrane at the same temperature, will produce $S_p > 0.01$ liter/s.

Typical H$_2$ output in a solar concentrator is:

$Q = 10^{-6}$ liter torr/s, therefore, for steady state conditions, $P = Q/S_p = 10^{-4}$ torr, as required to maintain thermal insulation conditions.

The Pd or Pd alloy or Pd coated membrane may be heated up to become active for diurnal operation of solar collectors, or continuous operation of other vacuum insulation jackets, by one of the methods below:

1. Incorporating the membrane in the outer metallic pipe wall of the vacuum-insulating jacket, radiation from the inner pipe will heat up the membrane to the working range temperature (FIG. 1).

2. Providing thermal contact with the inner pipe, or with structural members thermally connected to the inner pipe, thermal conduction will heat up the membrane to about the temperature of the hot medium.

3. On solar collectors, incorporating the membrane in the outer glass pipe (see FIG. 2) brings the membrane close to the focus of the concentrator mirror. It will, therefore, be heated up to several hundred degrees centigrade.

4. Photovoltaic, battery or mains-powered heating.

5. A possible additional way to heat up the pump is by illuminating it with a lamp, or in preferred embodiments of the present invention by a hot filament which is mounted in close proximity to the membrane. Alternatively, it is possible to use a mobile radio frequency source that, when attached to the membrane or positioned adjacent thereto, ionizes the H$_2$, thus achieving the same effect as the hot filament.

Figure 3:
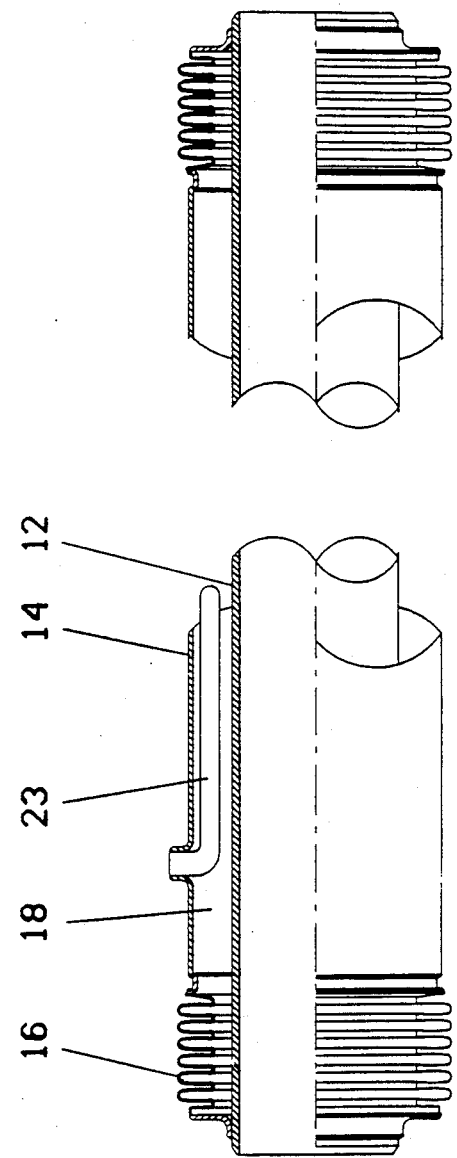
FIG. 3 is a partly cross-sectional view of a solar collector of the concentrator type, with a tubularly configured hydrogen pumping palladium membrane incorporated in the heat collector element.

FIG. 3 shows the same vacuum-insulated pipe unit of a solar collector of the concentrator type as shown in FIG. 2 and the same numerals have been used to indicate identical parts, the variation being in the positioning of the hydrogen pumping palladium membrane.

In this embodiment the inner pipe 12 is surrounded by an outer pipe 14 and in the evacuated space 18 between the inner and outer pipe there is positioned a hollow palladium tube 23 having an open end 24 passing through the wall of outer pipe 14 and thus open along its entire inner surface to the atmosphere.

The advantage of using such a palladium or palladium coated tube 23 as the hydrogen pumping membrane is that the entire surface of the tube functions as a hydrogen pumping membrane and stresses on the membrane caused by the pressure difference between the vacuum and the atmosphere sides are better distributed.

It is alternatively possible to coat the inner and outer surfaces of one or more sections of the vacuum insulation jacket to convert said section into a hydrogen pumping membrane according to the present invention. Thus, e.g. it is possible to coat the inner and outer surfaces of steel bellows 16 with palladium or a palladium alloy whereby the bellows 16 serve as a hydrogen pumping membrane for the vacuum insulation jackets or solar energy collectors of the present invention.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydrogen pump for vacuum insulation jackets for a vessel or pipe which holds or through which flows a hydrogen-containing medium at temperatures such that hydrogen permeates into said jacket, comprising a palladium or palladium alloy membrane exposed on a first side to an external oxidizing atmosphere having a relatively high hydrogen partial pressure, and on a second side to the evacuated space having a relatively low hydrogen partial pressure within said jacket, wherein said membrane enables the flow of said hydrogen from said evacuated space through said membrane into said oxidizing atmosphere and said palladium membrane catalyzes the reaction of said hydrogen permeated through said palladium membrane and oxygen present in said external atmosphere to form water to reduce the hydrogen partial pressure at said second side of the membrane creating a hydrogen gradient that moves said hydrogen from said evacuated space to said external atmosphere.

2. A hydrogen pump for use in a solar energy collector of the type utilizing fluids of hydrogen-containing compounds for heat transfer and having a vacuum jacket for achieving thermal insulation, into which vacuum permeates hydrogen produced by the decomposition of said heat transfer fluid, comprising a palladium or palladium alloy membrane exposed on a first side to an external oxidizing atmosphere having a relatively high hydrogen partial pressure and on a second side to the evacuated space having a relatively low hydrogen partial pressure within said jacket, wherein said membrane enables the flow of said hydrogen from said evacuated space through said membrane into said oxidizing atmosphere and said palladium membrane catalyzes the reaction of said hydrogen permeated through said palladium membrane and oxygen present in said external atmosphere to form water to reduce the hydrogen partial pressure at said second side of the membrane creating a hydrogen gradient that moves said hydrogen from said evacuated space to said external atmosphere.

3. A hydrogen pump according to claim 1 wherein the membrane is an integral element of the jacket.

4. A hydrogen pump according to claim 1 wherein the membrane is configured as a tube extending into the evacuated space within said jacket and having an opened end passing through the wall of said jacket and open to the atmosphere.

5. A hydrogen pump according to claim 1 wherein said membrane is formed in a wall of said jacket.

* * * * *